(12) United States Patent
Noda et al.

(10) Patent No.: US 10,583,635 B2
(45) Date of Patent: Mar. 10, 2020

(54) DECORATIVE SHEET

(71) Applicant: Dai Nippon Printing Co., Ltd., Tokyo (JP)

(72) Inventors: Akihisa Noda, Tokyo (JP); Hiroki Kawanishi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 123 days.

(21) Appl. No.: 15/515,189

(22) PCT Filed: Sep. 30, 2015

(86) PCT No.: PCT/JP2015/077757
§ 371 (c)(1),
(2) Date: Mar. 29, 2017

(87) PCT Pub. No.: WO2016/052628
PCT Pub. Date: Apr. 7, 2016

(65) Prior Publication Data
US 2017/0217136 A1    Aug. 3, 2017

(30) Foreign Application Priority Data

Sep. 30, 2014  (JP) .................................. 2014-200482

(51) Int. Cl.
| | | |
|---|---|---|
| *B32B 27/00* | (2006.01) | |
| *C09D 175/04* | (2006.01) | |
| *C08J 7/04* | (2006.01) | |
| *C09D 5/00* | (2006.01) | |

(Continued)

(52) U.S. Cl.
CPC ............ *B32B 27/00* (2013.01); *C09D 175/04* (2013.01); *C08J 7/04* (2013.01); *C09D 5/002* (2013.01); *C09D 163/00* (2013.01); *C09D 167/00* (2013.01)

(58) Field of Classification Search
CPC ......... B32B 27/00; B32B 27/06; B32B 27/30; B32B 27/08; B32B 27/302; B32B 27/304; B32B 27/306; B32B 27/308; B32B 33/00
See application file for complete search history.

(56) References Cited

FOREIGN PATENT DOCUMENTS

| JP | 2000-071410 A | 3/2000 |
|---|---|---|
| JP | 2000-246859 A | 9/2000 |
| JP | 2002292798 A | 10/2002 |

(Continued)

OTHER PUBLICATIONS

English Translation of International Search Report dated Nov. 17, 2015, issued for PCT/JP2015/077757.

(Continued)

*Primary Examiner* — Stella K Yi
(74) *Attorney, Agent, or Firm* — Locke Lord LLP; James E. Armstrong, IV; Nicholas J. DiCeglie, Jr.

(57) ABSTRACT

The present invention provides a decorative sheet capable of vividly displaying deep-color designs including raven blackness. The decorative sheet includes a base material, and at least a protective layer, a primer layer, and a decorative layer laminated in this order on the base material, wherein the decorative layer contains a black pigment and the primer layer is formed of a cured product of a resin composition containing a resin A having a hydroxyl value of 44 mgKOH/g or less.

6 Claims, 2 Drawing Sheets

(51) Int. Cl.
*C09D 163/00* (2006.01)
*C09D 167/00* (2006.01)

(56) References Cited

FOREIGN PATENT DOCUMENTS

| | | | |
|---|---|---|---|
| JP | 2005-022359 A | | 1/2005 |
| JP | 2007108256 A | | 4/2007 |
| JP | 2013-075502 A | | 4/2013 |
| JP | 2013075502 | * | 4/2013 |
| JP | 2013-082216 A | | 5/2013 |
| JP | 2013111943 A | | 6/2013 |

OTHER PUBLICATIONS

European Search Report dated Apr. 18, 2018, issued for Counterpart European Patent Appln. No. 15846238.2.
Office Action issued in corresponding Japanese Patent Application No. JP 2014-200482, dated Jan. 21, 2020.

* cited by examiner

DECORATIVE SHEET

TECHNICAL FIELD

The present invention relates to a decorative sheet capable of vividly displaying a deep-color design such as one with raven blackness, and a decorative resin molded article obtained using the decorative sheet.

BACKGROUND ART

For resin molded articles to be used in automobile interiors and exteriors, building interior materials, household electric appliances and so on, and resin molded articles to be used in organic glass that is used as an alternative material for inorganic glass, etc., techniques for laminating a decorative sheet for the purpose of surface protection and impartment of design property are used. Decorative sheets to be used in these techniques can be classified broadly into lamination-type decorative sheets and transfer-type decorative sheets. In the lamination-type decorative sheet, a surface protective layer is laminated on a support base material so as to be situated on the outermost surface, and a molded resin is laminated on the support base material side, so that the support base material is incorporated in a resin molded article. On the other hand, in the transfer-type decorative sheet, a surface protective layer is laminated on a support base material directly or with a release layer interposed therebetween, the release layer being provided as necessary, and a molded resin is laminated on a side opposite to the support base material, followed by separating the support base material, so that the support base material does not remain in a resin molded article. These two types of decorative sheets are used properly according to the shapes of resin molded articles and required functions.

In recent years, resin molded articles obtained using a transfer-type decorative sheet have been required to have more advanced design property with diversification of users' preferences, and for example, an advanced design having a deep and glossy vivid hue like one obtained by applying a deep-colored lacquer, such a design with raven blackness, has been desired. Not only a decorative layer but also a base material or a surface protective layer contributes to display of a hue having a color and gloss like raven blackness. In this connection, a method has been proposed in which by using a specific pigment in a decorative layer and enhancing the transparency of a layer disposed on the outermost side of a resin molded article, for example, such a deep color that images of surroundings are projected on a surface of the resin molded article is displayed (see, for example, Patent Document 1).

The technique described in Patent Document 1 is a technique relating to a lamination-type decorative sheet in which a decorative layer is in contact with a base material disposed on the outermost side of a resin molded article. On the other hand, in a transfer-type decorative sheet, a surface protective layer, a support base material and so on are formed outside a decorative layer, and thus in a sheet state, the decorative layer is not exposed. The transfer-type decorative sheet is integrated with a molded resin, and the surface protective layer exposed after separation of the support base material forms a surface of the resin molded article. Accordingly, when a transfer-type decorative sheet is used, it is further difficult to ensure that a color and gloss in observation of a resin molded article decorated by a decorative sheet is made close to a desired color and gloss set in design of a product.

For solving the above-mentioned problem, for example, Patent Document 2 discloses a decorative film including a base material, a release layer, a surface protective layer, a primer layer and a decorative layer in this order, wherein the surface protective layer is composed of a cured product of an ionizing radiation curable resin composition, the primer layer is composed of a primer layer forming resin composition containing a polymer polyol, an isocyanate-based curing agent, and a binder resin having a glass transition temperature Tg of 77° C. or lower, and the content of the binder resin is 10 to 60% by mass based on the total amount of the polymer polyol and the binder resin.

PRIOR ART DOCUMENTS

Patent Documents

Patent Document 1: Japanese Patent Laid-open Publication No. 2002-292798

Patent Document 2: Japanese Patent Laid-Open Publication No. 2013-75502

SUMMARY OF THE INVENTION

Problems to be Solved by the Invention

According to the technique disclosed in Patent Document 2, even when a primer layer is disposed between a decorative layer and a base material, or a surface protective layer exposed after separation of the base material forms a surface of a resin molded article, a color and gloss that is displayed exhibits a vivid hue, so that a deep color, particularly raven blackness can be vividly displayed.

In recent years, however, it has been required to display raven blackness having a hue with more vivid color and gloss, and development of a technique, in addition to the technique disclosed in Patent Document 2, has been desired for obtaining, for example, a resin molded article having, on at least a part of a surface on the protective layer side, a black portion with a very low brightness in which the L* value in the L*a*b* color system is 2.5 or less.

In view of the circumstances described above, a main object of the present invention is to provide a decorative sheet capable of vividly displaying a deep-color design such as one with raven blackness. Further, an object of the present invention is to provide a decorative resin molded article obtained using the decorative sheet.

Means for Solving the Problem

In order to achieve the above-mentioned object, the present inventors have extensively conducted studies. As a result, the present inventors have devised a decorative sheet including a base material, and at least a protective layer, a primer layer and a decorative layer laminated in this order on the base material, the decorative layer containing a black pigment, the primer layer being formed of a cured product of a resin composition containing a resin A having a hydroxyl value of 44 mg KOH/g or less, and the present inventors found that the decorative sheet is capable of vividly displaying a deep-color design such as one with raven blackness, and for example, a resin molded article having, on at least a part of a surface on the protective layer side, a black portion with a very low brightness in which the L* value in the L*a*b* color system is 2.5 or less can be obtained using the decorative sheet. The present invention is an invention that has been completed by further conducting studies based on the above-mentioned findings.

That is, the present invention provides inventions of aspects as listed below.

Item 1. A decorative sheet including a base material, and at least a protective layer, a primer layer and a decorative layer are laminated in this order on the base material. the decorative layer containing a black pigment, the primer layer being formed of a cured product of a resin composition containing a resin A having a hydroxyl value of 44 mg KOH/g or less.

Item 2. The decorative sheet according to item 1, wherein the resin A has a glass transition temperature in a range of 50 to 140° C.

Item 3. The decorative sheet according to item 1 or 2, wherein the resin A has a hydroxyl value in a range of 0 to 25 mg KOH/g.

Item 4. The decorative sheet according to any one of items 1 to 3, wherein a content of the resin A in the resin composition is 10% by mass or more based on an amount of resin components contained in the resin composition.

Item 5. The decorative sheet according to any one of items 1 to 4, wherein the decorative layer is formed of the black pigment, and a resin composition containing a binder resin composed of the same resin as the resin A.

Item 6. The decorative sheet according to any one of items 1 to 5, wherein at least a part of the decorative layer has a portion displaying a black design.

Item 7. A decorative resin molded article obtained by transferring the decorative sheet according to any one of items 1 to 6 to a molded resin layer.

Item 8. The decorative resin molded article according to item 7, which has, on at least a part of a surface on the protective layer side, a black portion in which an L* value in the L*a*b* color system is 2.5 or less.

Advantages of the Invention

According to the present invention, there can be provided a decorative sheet capable of vividly displaying a deep-color design such as one with raven blackness. Further, according to the present invention, there can be provided a decorative resin molded article obtained using the decorative sheet.

EMBODIMENTS OF THE INVENTION

1. Decorative Sheet

Figure 1:
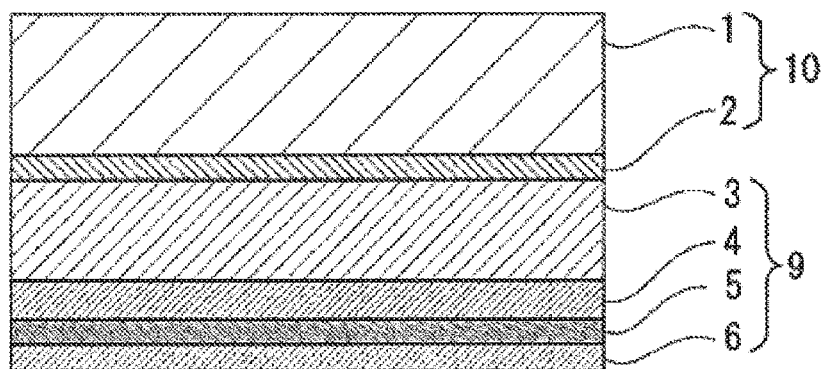
FIG. 1 is a schematic view of a cross section structure of one form of a decorative sheet according to the present invention.

A decorative sheet according to the present invention is a decorative sheet including a base material, and at least a protective layer, a primer layer and a decorative layer are laminated in this order on the base material, the decorative layer containing a black pigment, the primer layer being formed of a cured product of a resin composition containing a resin A having a hydroxyl value of 44 mg KOH/g or less. Accordingly, the decorative sheet is capable of vividly displaying a deep-color design such as one with raven blackness. The decorative sheet according to the present invention can be laminated to various adherends, followed by separating a base material to transfer a protective layer, a primer layer and a decorative layer to the decorative sheet. The adherend is not particularly limited, and for example, a molded resin is suitably used as the adherend. The decorative sheet according to the present invention is particularly useful for production of a decorative resin molded article by transferring a protective layer, a primer layer and a decorative layer onto a molded resin. Hereinafter, the decorative sheet according to the present invention will be described in detail mainly for an aspect of the decorative sheet to be used for production of a decorative resin molded article.

Laminated Structure of Decorative Sheet

The decorative sheet according to the present invention includes a base material, and at least a protective layer 3, a primer layer 4 and a decorative layer 5 on the base material 1. A surface of the base material 1 on the protective layer 3 side may be provided with a release layer 2 as necessary for the purpose of, for example, improving separability between the base material 1 and the protective layer 3. An adhesive layer 6 may be provided as necessary for the purpose of, for example, improving adhesion between the decorative layer 5 and the molded resin layer 8.

Examples of the laminated structure of the decorative sheet according to the present invention include a laminated structure in which a base material, a protective layer, a primer layer and a decorative layer are laminated in this order; a laminated structure in which a base material, a release layer, a protective layer, a primer layer and a decorative layer are laminated in this order; a laminated structure in which a base material, a protective layer, a primer layer, a decorative layer and an adhesive layer are laminated in this order; and a laminated structure in which a base material, a release layer, a protective layer, a primer layer, a decorative layer and an adhesive layer are laminated in this order. As one aspect of the laminated structure of the decorative sheet according to the present invention, FIG. 1 shows a schematic view of a cross section structure of one form of a decorative sheet in which a base material, a release layer, a protective layer, a primer layer, a decorative layer and an adhesive layer are laminated in this order.

Compositions of Layers Forming Decorative Sheet

[Support 10]

The decorative sheet according to the present invention includes as the support 10 the base material 1, and the release layer 2 as necessary. As described later, the protective layer 3 formed on the base material 1, and the primer layer 4, the decorative layer 5, and the adhesive layer 6 etc. additionally provided as necessary form a transfer layer 9. In the present invention, the decorative sheet and the molded resin are integrally molded, the support 10 and the transfer layer 9 are then peeled from each other at the interface therebetween, and the support 10 is separated and removed to obtain a decorative resin molded article.

(Base Material 1)

In the present invention, the base material 1 is used as the support 10 which serves as a support member in the decorative sheet. The base material 1 for use in the present invention is selected in consideration of suitability for vacuum molding, and typically a resin sheet formed of a thermoplastic resin is used, Examples of the thermoplastic resin include polyester resins; acrylic resins; polyolefin resins such as polypropylene and polyethylene; polycarbonate resins; acrylonitrile-butadiene-styrene resins (ABS resins); and vinyl chloride resins.

In the present invention, it is preferable to use a polyester sheet as the base material 1 from the viewpoint of heat resistance, dimensional stability, moldability and versatility. The polyester resin that forms the polyester sheet refers to a polymer including an ester group obtained by polycondensation with a polyfunctional carboxylic acid and a polyhydric alcohol, and may be preferably polyethylene terephthalate (PET), polybutylene terephthalate (PBT), polyethylene naphthalate (PEN) or the like, with polyethylene terephthalate (PET) being especially preferable from the viewpoint of heat resistance and dimensional stability.

The base material 1 may contain fine particles for the purpose of improving workability. Examples of the fine particles may include inorganic particles such as those of calcium carbonate, magnesium carbonate, calcium sulfate, barium sulfate, lithium phosphate, magnesium phosphate, calcium phosphate, aluminum oxide, silicon oxide and kaolin, organic particles such as those of acryl-based resins, and internally deposited particles. The average particle size of the tine particles is preferably 0.01 to 5.0 µm, more preferably 0.05 to 3.0 µm. The content of the fine particles in the polyester resin is preferably 0.01 to 5.0% by mass, more preferably 0.1 to 1.0% by mass. Various kinds of stabilizers, lubricants, antioxidants, antistatic agents, defoaming agents, fluorescent whitening agents and so on can be blended to base material 1 as necessary.

The polyester sheet to be suitably used as the base material 1 in the present invention is produced, for example, in the following manner. First, the polyester-based resin and other raw materials are fed into a well-known melt extrusion apparatus such as an extruder, and heated to a temperature equal to or higher than the melting point of the polyester-based resin to be melted. The molten polymer is then rapidly cooled and solidified on a rotary cooling drum while being extruded so as to have a temperature equal to or lower than the glass transition temperature, so that a substantially noncrystalline unoriented sheet is obtained. The sheet is biaxially stretched to be sheeted, and is subjected to heat setting to obtain the polyester sheet. Here, the stretching method may be sequential biaxial stretching or simultaneous biaxial stretching. The sheet may also be stretched again in a longitudinal and/or lateral direction before or after being subjected to heat setting. In the present invention, the draw ratio is preferably 7 or less, more preferably 5 or less, further preferably 3 or less in terms of an area ratio for obtaining sufficient dimensional stability. When the resulting polyester sheet is used in a decorative sheet for three-dimensional molding in injection molding, the decorative sheet is not shrunk again in a temperature range where the injected resin is injected, and thus a sheet strength required in the temperature range can be obtained as long as the draw ratio is in a range as described above. The polyester sheet may be produced as described above, or may be obtained as a commercial product.

One or both of the surfaces of the base material 1 can be subjected to a physical or chemical surface treatment such as an oxidation method or a roughening method as desired for the purpose of improving adhesion with the later-described release layer 2. Examples of the oxidation method include corona discharge treatment, chromium oxidation treatment, flame treatment, hot air treatment and ozone/ultraviolet ray treatment methods, and examples of the roughening method include sand blasting methods and solvent treatment methods. The surface treatment is appropriately selected according to the type of the base material 1, but in general, a corona discharge treatment method is preferably used from the viewpoint of an effect, handling characteristics and so on.

The base material 1 may be subjected to such a treatment that an easily adhesive layer is formed for the purpose of, for example, enhancing interlayer adhesion between the base material 1 and a layer provided thereon. When a commercial product is used as the polyester sheet, one subjected to the above-mentioned surface treatment beforehand, or one provided with an easily adhesive layer can be used as the commercial product.

The thickness of the base material 1 is normally 10 to 150 µm, preferably 10 to 125 µm, more preferably 10 to 80 µm. As the base material 1, a single-layer sheet of the above-mentioned resin, or a multi-layer sheet of the same resin or different resins can be used.

(Release Layer 2)

The release layer 2 is provide on a surface of the base material 1, on the side which the protective layer 3 is laminated, as necessary for the purpose of, for example, improving separability between the base material 1 and the protective layer 3. The release layer 2 may be a solid release layer covering the whole surface (wholly solid), or may be partially provided. Normally, the release layer 2 is preferably a solid release layer in view of separability.

The release layer 2 can be formed using the following resins alone or a resin composition obtained by mixing two or more thereof: thermoplastic resins such as silicone-based resins, fluorine-based resins, acryl-based resins (including, for example, acryl-melamine-based resins), polyester-based resins, polyolefin-based resins, polystyrene-based resins, polyurethane-based resins, cellulose-based resins, vinyl chloride-vinyl acetate-based copolymer resins and cellulose nitrate; copolymers of monomers that form the thermoplastic resins; and (meth)acrylic acid or urethane-modified products of these resins. Among them, acryl-based resins, polyester-based resins, polyolefin-based resins, polystyrene-based resins, copolymers of monomers that form these resins, and urethane-modified products thereof are preferable, and more specific examples include acryl-melamine-based resins alone, acryl-melamine-based resin-containing compositions, resin compositions obtained by mixing a polyester-based resin with a urethane-modified product of a copolymer of ethylene and acrylic acid, and resin compositions obtained by mixing an acryl-based resin with an emulsion of a copolymer of styrene and acryl. It is especially preferable that the release layer 2 be formed of an acryl-melamine-based resin alone, or a composition containing 50% by mass or more of an acryl-melamine-based resin among the above-mentioned resins. In the present invention, the "(meth)acrylic acid" means an "acrylic acid" or a "methacrylic acid", and the same applies to other similar terms. The release layer 2 can be formed using an ionizing radiation curable resin composition as described in the section "Protective Layer 3" in which at least one of prepolymers, oligomers and monomers which are crosslinked and cured when irradiated with an ionizing radiation and which have a polymerizable unsaturated bond or an epoxy group in the molecule is appropriately mixed.

The thickness of the release layer 2 is normally about 0.01 to 5 µm, preferably about 0.05 to 3 µm.

(Transfer Layer 9)

the decorative sheet according to the present invention, the protective layer 3, the primer layer 4, the decorative layer 5, and the adhesive layer 6 etc., all are formed on the support 10, additionally formed as necessary form the transfer layer 9. In the present invention, the decorative sheet and the molded resin are integrally molded, and the support 10 and the transfer layer 9 are then peeled from each other at the interface therebetween, so that the transfer layer 9 of the decorative sheet is transferred to the molded resin layer 8 to obtain a decorative resin molded article.

[Protective Layer 3]

The protective layer 3 is a layer that is provided on the decorative sheet in such a manner as to be situated on the outermost surface of the resin molded article for improving the chemical resistance, scratch resistance and the like of the decorative sheet. In the present invention, the resin for forming the protective layer 3 is not particularly limited, examples thereof include thermosetting resins, thermoplastic resins and ionizing radiation curable resins, and the resin can be appropriately selected according to a use of the decorative sheet. Among these resins, ionizing radiation curable resins are preferable for improving the scratch resistance of the decorative sheet, and imparting excellent surface characteristics. The protective layer 3 may include one layer, or two or more layers.

The thermosetting resin is not particularly limited, and examples thereof include epoxy resins, phenol resins, urea resins, unsaturated polyester resins, melamine resins, alkyd resins, polyimide resins, silicone resins, hydroxyl group-functional acrylic resins, carboxyl-functional acrylic resins, amide-functional copolymers and urethane resins. The thermoplastic resin is not particularly limited, and specific examples thereof include acrylic resins such as polymethyl (meth)acrylate and polyethyl (meth)acrylate; polyolefin-based resins such as polypropylene and polyethylene; polycarbonate resins; polyvinyl chloride-based resins; polyester resins such as polyethylene terephthalate (PET), polybutylene terephthalate (PBT) and polyethylene naphthalate (PEN); acrylonitrile-butadiene-styrene resins (ABS resins); and acrylonitrile-styrene-acrylic acid ester resins.

(Ionizing Radiation Curable Resin)

The ionizing radiation curable resin to be used for formation of the protective layer 3 is a resin that is crosslinked and cured when irradiated with an ionizing radiation, and specific examples thereof include those in which at least one of prepolymers, oligomers and monomers each having a polymerizable unsaturated bond or an epoxy group in the molecule is appropriately mixed. Here, the ionizing radiation means an electromagnetic wave or charged particle ray having an energy quantum capable of polymerizing or crosslinking a molecule, and normally an ultraviolet (UV) ray or an electron beam (EB) is used, but the ionizing radiations also include electromagnetic waves such as an X-ray and a γ-ray, and charged particle rays such as an α-ray and an ion beam. Among ionizing radiation curable resins, electron beam curable resins are suitably used in formation of the protective layer 3 because they can be made solventless, do not require an initiator for photopolymerization, and exhibit stable curing characteristics.

As the monomer to be used as an ionizing radiation curable resin, (meth)acrylate monomers having a radical-polymerizable unsaturated group in the molecule are suitable, and among them, polyfunctional (meth)acrylate monomers are preferable. The polyfunctional (meth)acrylate monomer may be a (meth)acrylate monomer having two or more polymerizable unsaturated bonds in the molecule (di- or more functional), preferably three or more polymerizable unsaturated bonds in the molecule (tri- or more functional). Specific examples of the polyfunctional (meth)acrylate include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, propionic acid-modified dipentaerythritol penta(meth)acrylate, dipentaerythritol hexa(meth)acrylate, ethylene oxide-modified dipentaerythritol hexa(meth)acrylate and caprolactone-modified dipentaerythritol hexa(meth)acrylate. These monomers may be used alone, or may be used in combination of two or more thereof.

As the oligomer to be used as an ionizing radiation curable resin, (meth)acrylate oligomers having a radical-polymerizable unsaturated group in the molecule are suitable, and among them, polyfunctional (meth)acrylate oligomers having two or more polymerizable unsaturated bonds in the molecule (di-or-more functional) are preferable. Examples of the polyfunctional (meth)acrylate oligomer include polycarbonate (meth)acrylate, acrylic silicone (meth)acrylate, urethane (meth)acrylate, epoxy(meth)acrylate, polyester (meth)acrylate, polyether (meth)acrylate, polybutadiene (meth)acrylate, silicone (meth)acrylate, and oligomers having a cation-polymerizable functional group in the molecule (e.g. novolac-type epoxy resins, bisphenol-type epoxy resins, aliphatic vinyl ethers, aromatic vinyl ethers and so on). Here, the polycarbonate (meth)acrylate is not particularly limited as long as it has a carbonate bond on the polymer main chain, and has a (meth)acrylate group at the end or side chain, and the polycarbonate (meth)acrylate can be obtained by esterifying a polycarbonate polyol with (meth)acrylic acid. The polycarbonate (meth)acrylate may be, for example, a polycarbonate-based urethane (meth)acrylate that is a urethane (meth)acrylate having a polycarbonate backbone. The urethane (meth)acrylate having a polycarbonate backbone is obtained by, for example, reacting a polycarbonate polyol, a polyvalent isocyanate compound and hydroxy (meth)acrylate. The acrylic silicone (meth)acrylate can be obtained by radical-copolymerizing a silicone macro-monomer with a (meth)acrylate monomer. The urethane (meth)acrylate can be obtained by, for example, esterifying a polyurethane oligomer with (meth) acrylic acid, the polyurethane oligomer being obtained by reaction of a polyether polyol, a polyester polyol, a caprolactone-based polyol or a polycarbonate polyol with a polyisocyanate compound. The epoxy (meth)acrylate can be obtained by, for example, reacting (meth)acrylic acid with an oxirane ring of a relatively low-molecular-weight bisphenol-type epoxy resin or novolac-type epoxy resin to perform esterification. Carboxyl-modified epoxy (meth)acrylate obtained by partially modifying the epoxy (meth)acrylate with a dibasic carboxylic anhydride can also be used. For example, the polyester (meth)acrylate can be obtained by esterifying hydroxyl groups of a polyester oligomer with (meth)acrylic acid, the polyester oligomer being obtained by condensation of a polyvalent carboxylic acid and a polyhydric alcohol and having a hydroxyl group at each of both ends, or by esterifying a hydroxyl group at the end of an oligomer with (meth)acrylic acid, the oligomer being obtained by adding an alkylene oxide to a polyvalent carboxylic acid. The polyether (meth)acrylate can be obtained by esterifying a hydroxyl group of a polyether polyol with (meth)acrylic acid. The polybutadiene (meth)acrylate can be obtained by adding (meth)acrylic acid to the side chain of a polybutadiene oligomer. The silicone (meth)

acrylate can be obtained by adding (meth)acrylic acid to the end or side chain of a silicone having a polysiloxane bond in the main chain. Among them, polycarbonate (meth) acrylate, urethane (meth)acrylate and the like are especially preferable as polyfunctional (meth)acrylate oligomers. These oligomers may be used alone, or may be used in combination of two or more thereof.

When the decorative sheet according to the present invention is used for three-dimensional molding, it is preferable to use polycarbonate (meth)acrylate, among the above-mentioned ionizing radiation curable resins, for obtaining excellent three-dimensional moldability. More preferably, polycarbonate (meth)acrylate and urethane (meth)acrylate are used in combination for securing both three-dimensional moldability and scratch resistance. When a polyfunctional (meth)acrylate monomer is used as the ionizing radiation curable resin, it is preferable to use the ionizing radiation curable resin in combination with a thermoplastic resin such as an acrylic resin for obtaining excellent three-dimensional moldability, and the mass ratio of the polyfunctional (meth) acrylate monomer and the thermoplastic resin in the ionizing radiation curable resin composition is preferably 25:75 to 75:25 for securing both three-dimensional moldability and scratch resistance. When a urethane (meth)acrylate is used as the ionizing radiation curable resin, a caprolactone-based urethane (meth)acrylate obtained by esterifying a polyurethane oligomer, which is obtained by reaction of a caprolactone-based polyol with a polyisocyanate compound, by a (meth)acrylic acid, or the above-mentioned polycarbonate-based urethane (meth)acrylate is preferably used for securing both three-dimensional moldability and scratch resistance.

(Inorganic Particles and Organic Particles)

The protective layer 3 may contain inorganic particles and/or organic particles for the purpose of, for example, improving the chemical resistance and scratch resistance of the decorative sheet, and vividly displaying a deep-color design such as one with raven blackness. When the protective layer 3 contains inorganic particles and/or organic particles, the total content of these particles in the protective layer 3 is preferably about 30 to 60% by mass, preferably about 40 to 50% by mass. The average particle size of these particles contained in the protective layer 3 is preferably about 0.01 to 0.5 μm. When the content and the particle size of these particles in the protective layer 3 is each in a range as described above, raven blackness obtained with the decorative sheet according to the present invention can be made more vivid. The types of inorganic particles and organic particles in the protective layer 3 may be the same as those shown for the primer layer 4 described later. The methods for measurement and calculation of the average particle size of the particles contained in the protective layer 3 are the same as methods shown for the primer layer 4 described later.

(Other Added Components)

In addition to the inorganic particles and organic particles, various kinds of additives can be blended in the protective layer 3 according to desired properties to be imparted to the protective layer 3. Examples of the additives include weather resistance improving agents such as ultraviolet absorbers and light stabilizers, abrasion resistance improvers, polymerization inhibitors, crosslinkers, infrared absorbers, antistatic agents, bondability improvers, leveling agents, thixotropy imparting agents, coupling agents, plasticizers, antifoaming agents, fillers, solvents and colorants. The additives can be appropriately selected from those that are commonly used. As the ultraviolet absorber and light stabilizer, a reactive ultraviolet absorber and light stabilizer having a polymerizable group such as a (meth)acryloyl group in the molecule can also be used.

(Thickness of Protective Layer 3)

The thickness of the protective layer 3 (thickness after drying or curing) is not particularly limited, but it is, for example, 1 to 1000 μm, preferably 1 to 50 μm, further preferably 1 to 30 μm. When the thickness of the protective layer 3 after drying or curing falls within the above-mentioned range, sufficient properties as a protective layer, such as scratch resistance and weather resistance, are obtained, and in the case where the protective layer 3 is formed using an ionizing radiation curable resin, the resin can be uniformly irradiated with an ionizing radiation, and therefore can be uniformly cured, thus being advantageous in terms of economy. Further, when the thickness of the protective layer 3 after drying or curing falls within the above-mentioned range, the three-dimensional moldability of the decorative sheet is further improved, and therefore high followability to a complicated three-dimensional shape in automobile interior applications or the like can be obtained.

(Formation of Protective Layer 3 with Ionizing Radiation Curable Resin)

Formation of the protective layer 3 is performed by, for example, preparing an ionizing radiation-curable resin composition containing an ionizing radiation curable resin, and applying and crosslinking/curing the ionizing radiation-curable resin composition. The viscosity of the ionizing radiation curable resin composition is not limited as long as an uncured resin layer can be formed on the surface of the primer layer 4 situated under the protective layer 3 by an application method as described later.

In the present invention, an uncured resin layer is formed by applying a prepared application liquid onto the primer layer 4 situated under the protective layer 3 using a known method such as gravure coating, bar coating, roll coating, reverse roll coating or comma coating, preferably gravure coating in such a manner that the above-mentioned thickness is obtained.

The uncured resin layer formed in this manner is irradiated with an ionizing radiation such as an electron beam or an ultraviolet ray to cure the uncured resin layer, so that the protective layer 3 is formed. When an electron beam is used as the ionizing radiation, an accelerating voltage thereof can be appropriately selected according to a resin to be used and a thickness of the layer, but the accelerating voltage is normally about 70 to 300 kV.

In irradiation of an electron beam, the transmission capacity increases as the accelerating voltage becomes higher, and therefore when a resin that is easily degraded by irradiation of an electron beam is used in a layer under the protective layer 3, an accelerating voltage is selected so that the transmission depth of the electron beam is substantially equal to the thickness of the protective layer 3. Accordingly, a layer situated under the protective layer 3 can be inhibited from being excessively irradiated with an electron beam, so that degradation of the layers by an excessive electron beam can be minimized.

The amount of radiation is preferably an amount with which the crosslinking density of the protective layer 3 is saturated, and the amount of radiation is selected within a range of normally 5 to 300 kGy (0.5 to 30 Mrad), preferably 10 to 50 kGy (1 to 5 Mrad).

Further, the electron beam source is not particularly limited, and various kinds of electron beam accelerators can be used such as, for example, those of Cockcroft-Walton type, Van de Graaff type, tuned transformer type, insulated core transformer type, linear type, dynamitron type and high frequency type.

When an ultraviolet ray is used as the ionizing radiation, it is practical to radiate light including an ultraviolet ray having a wavelength of 190 to 380 nm. The ultraviolet ray source is not particularly limited, and examples thereof include high-pressure mercury lamps, low-pressure mercury lamps, metal halide lamps, carbon arc lamps and ultraviolet-ray emitting diodes (LED-UV).

The protective layer 3 thus formed may be treated to give thereto functions such as a hard coat function, an anticlouding coat function, an antifouling coat function, an antiglare coat function, an antireflection coat function, an ultraviolet shielding coat function and an infrared shielding coat function by adding various kinds of additives.

[Primer Layer 4]

The primer layer 4 is a layer that is provided for improving adhesion between the protective layer 3 and a layer situated thereunder (on a side opposite to the support 10), and vividly displaying a deep-color design such as one with raven blackness in decorative resin molded article after transfer by interaction of the primer layer 4 with the later-described decorative layer 5 containing a black pigment with the primer layer 4 being formed of a cured product of a resin composition containing the resin A having a hydroxyl value of 44 mg KOH/g or less. When a figure, character, patterned picture or non-figure unicolor design formed on the decorative layer 5 is expressed with a particularly deep-color tone, an original hue of the tone, for example a hue with raven blackness in the case of black color, can be vividly displayed by disposing the primer layer 4. In addition, the primer layer 4 contributes to improvement of adhesion, improvement of weather resistance, improvement of strength, and so on.

The resin A to be used for formation of the primer layer 4 is not particularly limited as long as it has a hydroxyl value of 44 mg KOH/g or less, and examples thereof include acryl-based resins, urethane-based resins, polyester-based resins, polyether-based resins, polycarbonate-based resins and polyvinyl chloride-based resins, with acryl-based resins being preferable. Preferably, the resin composition for forming the primer layer 4 contains an isocyanate-based curing agent together with the resin A.

For example, for obtaining a resin molded article having, on at least a part of a surface on the protective layer side, a black portion with a very low brightness in which the L* value of is 2.5 or less, the hydroxyl value of the resin A is preferably in the range of about 0 to 40 mg KOH/g, more preferably in the range of about 0 to 25 mg KOH/g. In the present invention, the hydroxyl value of resin is a value measured by a method specified in JIS K1557-1.

The glass transition temperature of the resin A is preferably 50° C. or higher. When the glass transition temperature of the resin A is 50° C. or higher, the transfer property of the decorative layer 5 in formation of the later-described decorative layer 5 on the primer layer 4 is improved. Thus, the quality of products is stabilized to favor production, and color unevenness in the decorative layer 5 hardly occurs, so that a resin molded article further excellent in design property can be provided. For improving the transfer property of the decorative layer 5, and more vividly displaying a deep-color design, the glass transition temperature of the resin A is preferably in the range of about 50 to 150° C., more preferably in the range of about 65 to 115° C. In the present invention, the glass transition temperature (° C.) means a temperature (° C.) at which a peak shoulder is formed in a differential scanning calorimetry (DSC) method.

The weight average molecular weight of the resin A is preferably in the range of about 1,000 to 500,000, more preferably in the range of about 5,000 to 100,000. In the present invention, the weight average molecular weight of resin is a value measured by gel permeation chromatography (GPC) analysis and calculated in terms of standard polystyrene.

The content of the resin A in resin components for forming the primer layer 4 in the present invention is not particularly limited, but for vividly displaying a deep-color design such as one with raven blackness, the content of the resin A is preferably 10% by mass or more, more preferably in the range of 25 to 100% by mass, further preferably in the range of 45 to 100% by mass, still further preferably in the range of 65 to 100% by mass. Especially preferably, the primer layer 4 is formed only of the resin A.

<Isocyanate-based Curing Agent>

When the resin composition for forming the primer layer 4 in the present invention contains an isocyanate-based curing agent, the isocyanate-based curing agent is not particularly limited, but it is preferably a polyvalent isocyanate, and for example, aromatic isocyanates such as 2,4-tolylene diisocyanate, xylene diisocyanate, naphthalene diisocyanate and 4,4'-diphenylmethane diisocyanate; aliphatic isocyanates or cycloaliphatic isocyanates such as 1,6-hexamethylene diisocyanate, 2,2,4-trimethylhexamethylene diisocyanate, isophorone diisocyanate, hydrogenated tolylene diisocyanate, hydrogenated diphenylmethane diisocyanate and xylylene diisocyanate; and the like can be used. Adducts or multimers of these various kinds of isocyanates, for example adducts of tolylene diisocyanate, trimers of tolylene diisocyanate, and the like can also be used. The isocyanate-based curing agents may be used alone, or may be used in combination of two or more thereof.

Among isocyanate-based curing agents, particularly aliphatic isocyanates such as 1,6-hexamethylene diisocyanate, cycloaliphatic isocyanates such as isophorone diisocyanate, hydrogenated tolylene diisocyanate and hydrogenated diphenylmethane diisocyanate, xylylene diisocyanate, or adducts or multimers of these isocyanates can be used. Particularly, these isocyanate-based curing agents are called non-yellowing-type isocyanate compounds, and are capable of maintaining a state in which an original hue of a color tome of a picture etc. formed on a decorative layer while suppressing yellowing in a weather resistance test etc. Thus, the isocyanate-based curing agent is preferably a non-yellowing-type isocyanate compound.

When the resin composition for forming the primer layer 4 contains an isocyanate-based curing agent, the content of the isocyanate-based curing agent in the resin composition is not particularly limited, but it is preferably about 3 to 45 parts by mass, more preferably about 3 to 25 parts by mass based on 100 parts by mass of resin components in the resin composition from the viewpoint of adhesion, and printability in lamination of the decorative layer etc.

<Binder Resin>

The resin composition for forming the primer layer 4 in the present invention may contain a binder resin in addition to the resin A. In the present invention, the binder resin is a resin that does not satisfy the above-mentioned requirement for the resin A, and has a hydroxyl value of more than 44 mg KOH/g. Specifically, a polyurethane-based resin, a vinyl chloride-vinyl acetate-based copolymer resin, a polyester resin or the like can be used as the binder resin. The weight average molecular weight of a resin that can be used as the binder resin is preferably about 10,000 to 300,000, more preferably about 50,000 to 200,000.

<Inorganic Particles and Organic Particles>

The primer layer 4 may contain inorganic particles and/or organic particles for further vividly displaying a deep-color design such as one with raven blackness in the decorative resin molded article after transfer. The total content of inorganic particles and/or organic particles in the primer layer 4 is preferably about 11 to 50% by mass, more preferably about 25 to 35% by mass.

The average particle size of inorganic particles and organic particles is not particularly limited, but it is preferably about 0.01 to 3 μm, more preferably about 1 to 2 μm for vividly displaying a deep-color design such as one with raven blackness by interaction of the primer layer 4 with the decorative layer 5. The average particle size of inorganic particles and organic particles means a 50% particle size (d50: median diameter) when the particles in a solution are measured by a dynamic light scattering method, and the particle size distribution is expressed as a cumulative distribution. The particle size is a value measured using a Microtrac particle size analyzer (manufactured by NIKKISO CO., LTD.).

The inorganic particles are not particularly limited, but for vividly displaying a deep-color design such as one with raven blackness by interaction of the primer layer 4 with the decorative layer 5, silica particles (colloidal silica, fumed silica, precipitated silica and so on), and metal oxide particles such as alumina particles, zirconia particles, titania particles and zinc oxide particles are preferable. Among them, silica particles and alumina particles are preferably, with silica particles being particularly preferable. The inorganic particles may be used alone, or may be used in combination of two or more thereof.

The organic particles are not particularly limited, but for vividly displaying a deep-color design such as one with raven blackness by interaction of the primer layer 4 with the decorative layer 5, urethane beads, nylon beads, acrylic beads, silicone beads, styrene beads, melamine beads, urethane acryl beads, polyester beads, polyethylene beads and so on are preferable. Among them, urethane beads, nylon beads and acrylic beads are preferable. The organic particles may be used alone, or may be used in combination of two or more thereof.

The shapes of the inorganic particles and organic particles are spherical, elliptical, polyhedral, scaly or the like, and the shapes of these particles are preferably uniform and well-ordered. As the inorganic particles and organic particles, commercially available products can also be used.

The primer layer 4 may contain inorganic particles and/or organic particles, but it is preferable that the primer layer 4 contains inorganic particles. The primer layer 4 may contain substantially only inorganic particles.

The thickness of the primer layer 4 is not particularly limited, but it is, for example, about 0.1 to 10 μm, preferably about 1 to 10 μm. When the primer layer 4 satisfies the thickness as described above, the deep-color design, such as one with raven blackness, of the decorative sheet can be more vividly displayed, and breakage, rupture, whitening and the like of the protective layer 3 can be effectively suppressed.

The primer layer 4 is formed by a normal coating method such as gravure coating, gravure reverse coating, gravure offset coating, spinner coating, roll coating, reverse roll coating, kiss coating, wheeler coating, dip coating, solid coaling with a silk screen, wire bar coating, flow coating, comma coating, pour coating, blushing or spray coating, or a transfer coating method using a resin composition for forming the primer layer 4. Here, the transfer coating method is a method in which a coating film of a primer layer or adhesive layer is formed on a thin sheet (film base material), and thereafter the surface of the intended layer in the decorative sheet is coated with the coating film.

[Decorative Layer 5]

The decorative layer 5 is a layer that is provided for vividly displaying a deep-color design such as one with raven blackness in the decorative resin molded article after transfer in cooperation with the primer layer 4. The decorative layer 5 contains a black pigment. A black design from the black pigment contained in the decorative layer 5 interacts with the primer layer 4 to vividly display a deep-color design such as one with raven blackness in the decorative resin molded article after transfer. The decorative layer 5 may be a partially provided layer, but it is preferable that the decorative layer 5 is (a wholly solid layer that is) formed over the whole of a surface of the decorative sheet. At least a part of the decorative layer 5 may have a portion displaying a black design, with the other portion displaying a design other than a black design.

The decorative layer 5 has at least one of a decorative picture layer and a decorative solid layer (not illustrated). The decorative layer 5 may have both a decorative picture layer and a decorative solid layer. The decorative picture layer and the decorative solid layer may be each stained with a concealing color as necessary, or may have transparency. The decorative sheet according to the present invention has the primer layer 4 formed using the resin A and the decorative layer 5 containing a black pigment, and therefore, for example, a resin molded article having, on at least a part of a surface on the protective layer 3 side, a black portion with a very low brightness in which the $L^*$ value is 2.5 or less is obtained. Such a resin molded article displays a color which is expressed as "vivid and glossy black", "piano black" or "raven black" when the resin molded article is observed through the protective layer 3.

The decorative picture layer and the decorative solid layer are each provided with a figure, characters, a patterned picture or the like using a printing ink. The picture is not limited as long as it can be printed by a common printing technique. Examples of the picture include woody textures, pebble-like textures, cloth-like textures, sand-like textures, geometrical figures and characters. The decorative solid layer is a layer that is uniformly formed over the whole of a surface of the primer layer 4. Alternatively, the decorative solid layer is formed over the whole of a surface of the primer layer 4 which is printed with the decorative picture layer. The decorative solid layer is disposed on the molded article side from the decorative picture layer for setting off a picture formed on the decorative picture layer. For ensuring that the ground color of a surface of a molded article before decoration is not viewed from the protective layer 3 side, it is preferable to form a decorative picture layer and decorative solid layer having high concealment property.

The black pigment contained in the decorative layer 5 is not particularly limited as long as it can display a black color, and examples thereof include carbon black and magnetite-type triiron tetraoxide. The black pigments may be used alone, or may be used in combination of two or more thereof. The particle size of the pigment is not particularly limited, but the average particle size of the pigment is preferably 10 nm to 100 nm, further preferably 10 nm to 40 nm.

The content of the black pigment in the decorative layer 5 is not particularly limited, but it is preferably about 10 to 50% by mass, more preferably about 30 to 40% by mass for vividly displaying a deep-color design such as one with raven blackness by interaction of the decorative layer 5 with the primer layer 4.

The decorative layer 5 is formed using a printing ink containing a black pigment, a binder resin, and a solvent or dispersion medium.

The decorative layer 5 may include a colorant other than a black pigment within the bounds of not hindering the effect of the present invention. The other colorant is not particularly limited, and examples thereof include metallic pigments formed of scalelike foil powders of metals such as aluminum, chromium, nickel, tin, titanium, iron phosphate, copper, gold, silver and brass, alloys or metal compounds; pearly luster (pearl) pigments formed of foil powders of mica-like iron oxide, titanium dioxide-coated mica, titanium dioxide-coated bismuth oxychloride, bismuth oxychloride, titanium dioxide-coated talc, scalelike foils, colored titanium dioxide-coated mica, basic lead carbonate and the like; fluorescent pigments such as strontium aluminate, calcium aluminate, barium aluminate, zinc sulfide and calcium sulfide; white inorganic pigments such as titanium dioxide, zinc white and antimony trioxide; inorganic pigments such as zinc white, iron red, vermilion, ultramarine blue, cobalt blue, titanium yellow and chrome yellow; organic pigments (including dyes) such as isoindolinone yellow, Hansa Yellow A, quinacridone red, permanent red 4R, phthalocyanine blue, indanthrene blue RS and aniline black. These other colorants may be used alone, or may be used in combination of two or more thereof.

The binder resin in the printing ink to be used for formation of the decorative layer 5 is not particularly limited, and examples thereof include acryl-based resins, styrene-based resins, polyester-based resins, urethane-based resins, chlorinated polyolefin-based resins, vinyl chloride-vinyl acetate copolymer-based resins, polyvinyl butyral resins, alkyd-based resins, petroleum-based resins, ketone resins, epoxy-based resins, melamine-based resins, fluorine-based resins, silicone-based resins, cellulose derivatives and rubber-based resins. These binder resins may be used alone, or may be used in combination of two or more thereof.

For improving compatibility between the primer layer and the decorative layer, and vividly displaying a deep-color design such as one with raven blackness, the decorative layer 5 may be formed of a resin composition containing the black pigment, and a binder resin composed of the same resin as the resin A. When the same resins are laminated, compatibility between the primer layer and the black decorative layer is improved, and therefore an interface is hardly generated between the primer layer and the black decorative layer, so that generation of interference fringes can be suppressed, leading to improvement of raven blackness property.

The solvent or dispersion medium in the printing ink to be used for formation of the decorative layer 5 is not particularly limited, and examples thereof include petroleum-based organic solvents such as hexane, heptane, octane, toluene, xylene, ethylbenzene, cyclohexane and methyl cyclohexane; ester-based organic solvents such as ethyl acetate, butyl acetate, acetic acid-2-methoxyethyl and acetic acid-2-ethoxyethyl; alcohol-based organic solvents such as methyl alcohol, ethyl alcohol, normal-propyl alcohol, isopropyl alcohol, isobutyl alcohol, ethylene glycol and propylene glycol; ketone-based organic solvents such as acetone, methyl ethyl ketone, methyl isobutyl ketone and cyclohexanone; ether-based organic solvents such as diethyl ether, dioxane and tetrahydrofuran; chlorine-based organic solvents such as dichloromethane, carbon tetrachloride, trichloroethylene and tetrachloroethylene; and water. These solvents or dispersion media in the printing ink may be used alone, or may be used in combination of two or more thereof.

The printing ink to be used for formation of the decorative layer 5 may contain an anti-settling agent, a curing catalyst, an ultraviolet absorber, an antioxidant, a leveling agent, a thickener, a defoaming agent, a lubricant and the like as necessary.

The decorative layer 5 can be formed on the adjacent layer such as the primer layer 4 by a known printing method such as gravure printing, flexographic printing, silk screen printing or offset printing.

The thickness of the decorative layer 5 is not particularly limited, and for example, it is about 1 to 40 µm, preferably about 3 to 30 µm.

[Adhesive Layer 6]

The adhesive layer 6 is a layer that is provided on, for example, a back surface (on the molded resin layer 8 side) of the decorative layer 5 as necessary for the purpose of, for example, improving adhesion between the decorative sheet and the molded resin layer 8. The resin for forming the adhesive layer 6 is not particularly limited as long as it can improve adhesion and bondability between the decorative layer and the molded resin layer, and examples thereof include thermoplastic resins and thermosetting resins. Examples of the thermoplastic resin include acrylic resins, acryl-modified polyolefin resins, chlorinated polyolefin resins, vinyl chloride-vinyl acetate copolymers, thermoplastic urethane resins, thermoplastic polyester resins, polyamide resins and rubber-based resins. The thermoplastic resins may be used alone, or may be used in combination of two or more thereof. Examples of the thermosetting resin include urethane resins and epoxy resins. The thermosetting resins may be used alone, or may be used in combination of two or more thereof.

The adhesive layer 6 is not a layer that is necessarily needed, but it is preferable to provide the adhesive layer 6 when it is conceivable that the decorative sheet according to the present invention is applied to a decoration method in which the decorative sheet is bonded onto a previously provided resin molded body, such as, for example, a vacuum press-bonding method as described later. When the decorative sheet is used in a vacuum press-bonding method, it is preferable to form the adhesive layer 6 using, among various resins described above, one that is commonly used as a resin which exhibits bondability under pressure or heating.

The thickness of the adhesive layer 6 is not particularly limited, but it is, for example, about 0.1 to 30 µm, preferably about 0.5 to 20 µm, further preferably about 1 to 8 µm.

2. Decorative Resin Molded Article and Method for Production Thereof

Figure 2:
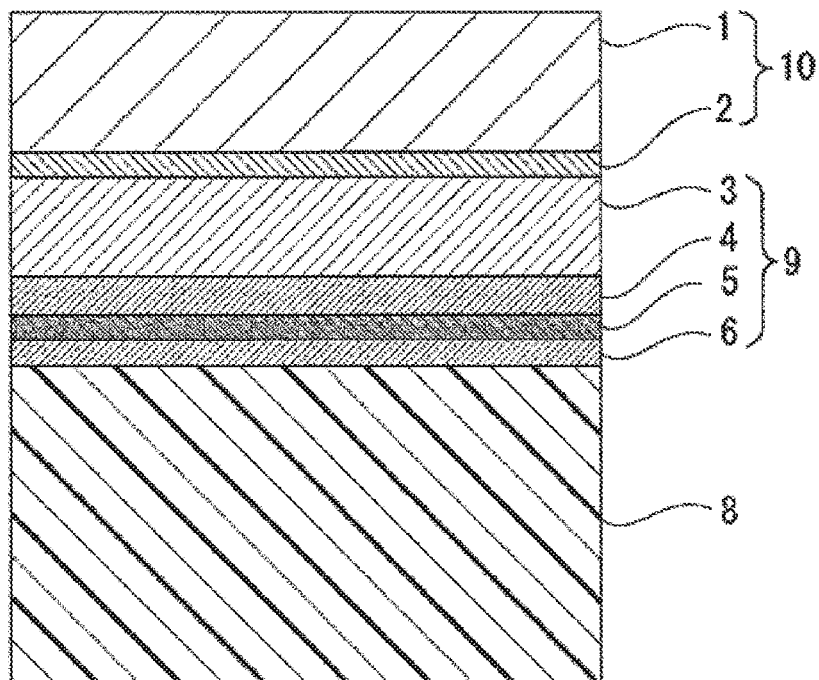
FIG. 2 is a schematic view of a cross section structure of one form of a decorative resin molded article with a support according to the present invention.
Figure 3:
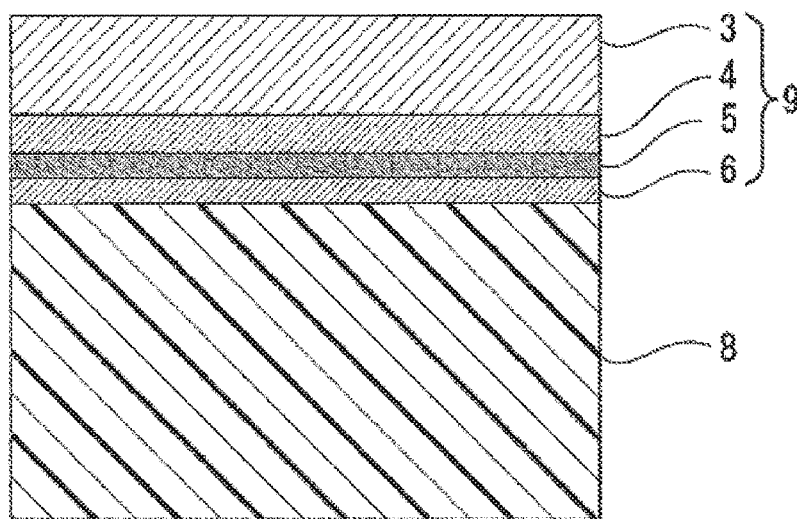
FIG. 3 is a schematic view of a cross section structure of one form of a decorative resin molded article according to the present invention.

The decorative resin molded article according to the present invention can be produced by integrating a molded resin with the decorative sheet according to the present invention, and transferring to the molded resin layer 8 the transfer layer 9 including the protective layer 3, the primer layer 4 and the decorative layer 5. Specifically, the decorative sheet according to the present invention is used as a transfer-type decorative sheet, and the molded resin layer 8 is laminated on a side opposite to the support 10 in the decorative sheet to obtain a decorative resin molded article with a support in which at least the molded resin layer 8, the decorative layer 5, the primer layer 4, the protective layer 3 and the support 10 are laminated in this order (see, for example, FIG. 2). Next, the support 10 is separated from the decorative resin molded article with a support to obtain the decorative resin molded article according to the present invention in which at least the molded resin layer 8, the decorative layer 5, the primer layer 4 and the protective layer 3 are laminated (see, for example, FIG. 3). As shown in FIG. 3, the decorative resin molded article according to the present invention may be further provided with the adhesive layer 6 and so on as necessary. In the decorative sheet according to the present invention, the protective layer 3, the decorative layer 5, the primer layer 4, the adhesive layer 6 and so on form the transfer layer 9, and the base material 1 and the release layer 2 form the support 10. The transfer layer 9 in the decorative sheet is transferred to the molded resin layer 8 to obtain a decorative resin molded article.

Preferably, the decorative resin molded article according to the present invention has, on at least a part of a surface on the protective layer side, a black portion in which the L* value is 2.5 or less. The decorative resin molded article according to the present invention is produced using the decorative sheet according to the present invention, and therefore can have such a black portion with a very low brightness, and excellent raven blackness can be displayed at the portion. Further, when the whole of a surface of the decorative resin molded article of the invention on the protective layer side has a black color in which the L* value is 2.5 or less, excellent raven blackness is displayed over the whole decorative resin molded article.

The L* value of a surface of the decorative resin molded article according to the present invention is a value obtained by measuring the L* value in the L*a*b* color system for a surface of the decorative resin molded article on the protective layer side using Spectrophotometric Colorimeter CM-2500d (light source: D65, angle: 10°) manufactured by KONICA MINOLTA, INC.

Examples of the method for producing the decorative resin molded article according to the present invention using the decorative sheet for transfer include a method including the steps of (1) to (5):

(1) heating a decorative sheet from the decorative layer side by a heating platen while the decorative layer side (side opposite to a support) of the decorative sheet is kept facing the inside of a mold;
(2) preliminarily molding (vacuum-molding) the heated decorative so as to follow the shape of the inside of a mold, and thus bringing the decorative sheet into close contact with the inner surface of the mold to close the mold;
(3) injecting a resin into the mold;
(4) cooling the injected resin, and then taking a decorative resin molded article (decorative resin molded article with a support) from the mold; and
(5) separating the support from a protective layer of the decorative resin molded article.

In both the steps (1) and (2), the temperature at which the decorative sheet is heated is preferably equal to or higher than a temperature in the vicinity of the glass transition temperature and lower than the melting temperature (or melting point) of the base material 1. Normally, it is more preferable to heat the decorative sheet at a temperature in the vicinity of the glass transition temperature of the transferring base material 1. The vicinity of the glass transition temperature refers to a range of the glass transition temperature±about 5° C., and is generally about 70 to 130° C. when a polyester film suitable as the base material 1 is used. When a mold having a shape which is not so complicated is used, the step of heating the decorative sheet and the step of preliminarily molding the decorative sheet may be omitted to mold the decorative sheet in the shape of the mold by means of heat and pressure from the injected resin in the later-described step (3).

In the step (3), the later-described molding resin is melted, and injected into a cavity to integrate the decorative sheet and the molding resin with each other. When the molding resin is a thermoplastic resin, the resin is heated and melted to be brought into a flowing state, and when the molding resin is a thermosetting resin, an uncured liquid composition is injected in a flowing state at room temperature or by appropriately heating the composition, and cooled to be solidified. Accordingly, the decorative sheet is integrally attached to the formed resin molded body to form a decorative resin molded article with a support. The temperature at which the injected resin is heated depends on the type of the molding resin, but is generally about 180 to 320° C.

The thus obtained decorative resin molded article with a support is cooled and then taken out from the mold in the step (4), and thereafter, in the step (5), the support 10 is separated from the protective layer 3 to obtain a decorative resin molded article. The step of separating the support 10 from the protective layer 3 may be carried out concurrently with the step of taking out the decorative resin molded article from the mold. In other words, the step (5) may be included in the step (4).

Further, production of the decorative resin molded article can be performed by a vacuum press-bonding method. In the vacuum press-bonding method, first the decorative sheet of the present invention and a resin molded body are placed in a vacuum press-bonding machine including a first vacuum chamber situated on the upper side and a second vacuum chamber situated on the lower side in such a manner that the decorative sheet is on the first vacuum chamber side and the resin molded body is on the second vacuum chamber side, and that the side of the decorative sheet on which the molded resin layer 8 is laminated faces the resin molded body side. The two vacuum chambers are then evacuated. The resin molded body is placed on a lift table that is provided on the second vacuum chamber side and is capable of moving up and down. Then, the first vacuum chamber is pressurized, and the molded body is abutted against the decorative sheet with the lift table, and by using a pressure difference between the two vacuum chambers, the decorative sheet is bonded to the surface of the resin molded body while being stretched. Finally, the two vacuum chambers are released to atmospheric pressure, the support 10 is separated, and an unnecessary portion of the decorative sheet is trimmed off as necessary, so that the decorative resin molded article according to the present invention can be obtained.

Preferably, the vacuum press-bonding method includes a step of heating the decorative sheet for softening the decorative sheet to improve the moldability thereof before the step of abutting the molded body against the decorative sheet. The vacuum press-bonding method including such a step may be referred to particularly as a vacuum heating and press-bonding method. The heating temperature in such a step may be appropriately selected according to a type of the resin that forms the decorative sheet, or a thickness of the decorative sheet, but when a polyester resin film or an acrylic resin film is used as, for example, the base material 1, the heating temperature may be normally about 60 to 200° C.

In the decorative resin molded article of the present invention, a resin appropriate to an intended use may be selected to form the molded resin layer 8. The molding resin for forming the molded resin layer 8 may be a thermoplastic resin or may be a thermosetting resin.

Specific examples of the thermoplastic resin include polyolefin-based resins such as polyethylene and polypropylene, ABS resins, styrene resins, polycarbonate resins, acrylic resins and vinyl chloride-based resins. These thermoplastic resins may be used alone, or may be used in combination of two or more thereof.

Examples of the thermosetting resin include urethane resins and epoxy resins. These thermosetting resins may be used alone, or may be used in combination of two or more thereof.

Since in the decorative resin molded article with a support, the support 10 serves as a protective sheet for the decorative resin molded article, the support 10 may be maintained as it is without being separated after production of the decorative resin molded article with a support, and may be separated at the time of use. When used in this manner, the decorative resin molded article can be prevented from being scratched by, for example, scraping during transportation.

The decorative resin molded article according to the present invention vividly displays a deep-color design such as one with raven blackness. Therefore, the resin molded article according to the present invention can be used for, for example, interior materials or exterior materials of vehicles such as automobiles; fittings such as window frames and door frames; interior materials of buildings such as walls, floors and ceilings; housings of household electric appliances such as television receivers and air conditioners; and containers etc.

EXAMPLES

Hereinafter, the present invention will be described in detail by way of examples and comparative examples. However, the present invention is not limited to examples.
[Production of Decorative Sheet]
A polyethylene terephthalate film (thickness: 50 μm) with an easily adhesive layer formed on one surface thereof was used as a base material. A coating solution mainly composed of a melamine-based resin was applied to a surface of the easily adhesive layer of the polyethylene terephthalate film by gravure printing to form a release layer (thickness: 1 μm). An ionizing radiation curable resin composition as shown in Table 1 was applied onto the release layer by a bar coater in such a manner that the thickness after curing would be 3 μm, so that a protective layer forming coating film was formed. The coating film was irradiated with an electron beam having an accelerating voltage of 165 kV and an amount of irradiation of 50 kGy (5 Mrad), so that the protective layer forming coating film vas cured to form a protective layer. A resin composition containing a resin A as described in Table 1 was applied onto the protective layer by gravure printing to form a primer layer (thickness: 1.5 μm). Further, a black solid decorative layer (thickness: 2 μm) was formed on the primer layer by gravure printing using a decorative layer forming black ink composition containing an acrylic resin and a vinyl chloride-vinyl acetate-based copolymer resin (50% by mass of acrylic resin and 50% by mass of vinyl chloride-vinyl acetate-based copolymer resin) as a binder resin, and 30% by mass of a black pigment (carbon black, average particle size: 13 nm). Further, using an adhesive layer forming resin composition containing an acryl-based resin (softening temperature: 125° C.), an adhesive layer (thickness: 2 μm) was formed on the decorative layer by gravure printing to produce a decorative sheet with a base material, a release layer, a protective layer, a primer layer, a decorative layer and an adhesive layer laminated in this order. Details of the ionizing radiation curable resin composition for forming the protective layer and the resin composition for forming the primer layer are as follows.

<Ionizing Radiation Curable Resin Composition>
Ionizing radiation curable resin composition A: Ionizing radiation curable resin composition containing 40 parts by mass of a polyfunctional (meth)acrylate monomer (pentaerythritol triacrylate, molecular weight: 298), 60 parts by mass of a thermoplastic resin (acrylic resin, glass transition temperature Tg: 105° C.) having a weight average molecular weight Mw of 150000, 1.1 parts by mass of an ultraviolet absorber, 0.6 parts by mass of a light stabilizer and 0.2 parts by mass of a leveling agent.
Ionizing radiation curable resin composition B: Ionizing radiation curable resin composition containing 94 parts by mass of a functional polycarbonate-based urethane acrylate (weight average molecular weight: 10,000), 6 parts by mass of a hexafunctional urethane acrylate (weight average molecular weight: 6,000), 1.1 parts by mass of an ultraviolet absorber, 0.6 parts by mass of a light stabilizer and 0.2 parts by mass of a leveling agent.

<Resin Composition for Forming Primer Layer>

Example 1

Resin composition containing an acryl-based resin a (glass transition temperature: 40° C., hydroxyl value: 0 mg KOH/g, weight average molecular weight: 105,000) and an isocyanate-based curing agent (XDI) at a mass ratio of 100:17.

Example 2

Resin composition containing an acryl-based resin b (glass transition temperature: 50° C., hydroxyl value: 0 mg KOH/g, weight average molecular weight: 70,000) and an isocyanate-based curing agent (XDI) at a mass ratio of 100:22.

Example 3

Resin composition containing an acryl-based resin c (glass transition temperature: 80° C., hydroxyl value: 0 mg KOH/g, weight average molecular weight: 65,000) and an isocyanate-based curing agent (XDI) at a mass ratio of 100:22.

Example 4

Resin composition containing an acryl-based resin d (glass transition temperature: 105° C., hydroxyl value: 0 mg KOH/g, weight average molecular weight: 68,000) and an isocyanate-based curing agent (XDI) at a mass ratio of 100:22.

Example 5

Resin composition containing an acryl-based resin e (glass transition temperature: 105° C., hydroxyl value: 0 mg KOH/g, weight average molecular weight: 40,000) and an isocyanate-based curing agent (XDI) at a mass ratio of 100:22.

Example 6

Resin composition containing an acryl-based resin f (glass transition temperature: 135° C., hydroxyl value: 25 mg KOH/g, weight average molecular weight: 15,000) and an isocyanate-based curing agent (XDI) at a mass ratio of 100:17.

Example 7

Resin composition containing an acryl-based resin g (glass transition temperature: 70° C., hydroxyl value: 35 mg KOH/g, weight average molecular weight: 50,000) and an isocyanate-based curing agent (XDI) at a mass ratio of 100:22.

Example 8

Resin composition containing an acryl-based resin h (glass transition temperature: 90° C., hydroxyl value: 40 mg KOH/g, weight average molecular weight: 35,000) and an isocyanate-based curing agent (XDI) at a mass ratio of 100:22.

Example 9

Resin composition containing an ester-based resin a (glass transition temperature: 65° C., hydroxyl value: 6 mg KOH/g, weight average molecular weight: 15,000) and an isocyanate-based curing agent (XDI) at a mass ratio of 100:17.

Example 10

Resin composition containing an ester-based resin b (glass transition temperature: 67° C., hydroxyl value: 6 mg KOH/g, weight average molecular weight: 17,000) and an isocyanate-based curing agent (XDI) at a mass ratio of 100:22.

Example 11

Resin composition containing a urethane-based resin a (glass transition temperature: 92° C., hydroxyl value: 19 mg KOH/g, weight average molecular weight: 6,000) and an isocyanate-based curing agent (XDI) at a mass ratio of 100:22.

Example 12

Resin composition containing a mixed resin of the acryl-based resin d (glass transition temperature: 105° C., hydroxyl value: 0 mg KOH/g, weight average molecular weight: 68,000) and the acryl-based resin i (glass transition temperature: 90° C., hydroxyl value: 81 mg KOH/g, weight average molecular weight: 35,000) (mass ratio in terms of a solid content: 100:50), and an isocyanate-based curing agent (XDI) at a mass ratio of 100:22.

Example 13

Resin composition containing a mixed resin of the acryl-based resin d (glass transition temperature: 105° C., hydroxyl value: 0 mg KOH/g, weight average molecular weight: 68,000) and an acryl-based resin i (glass transition temperature: 90° C., hydroxyl value: 81 mg KOH/g, weight average molecular weight: 35,000) (mass ratio in terms of a solid content: 100:115), and an isocyanate-based curing agent (XDI) at a mass ratio of 100:22.

Example 14

Resin composition containing a mixed resin of the acryl-based resin d (glass transition temperature: 105° C., hydroxyl value: 0 mg KOH/g, weight average molecular weight: 68,000) and the acryl-based resin i (glass transition temperature: 90° C. hydroxyl value: 81 mg KOH/g, weight average molecular weight: 35,000) (mass ratio in terms of a solid content: 100:270), and an isocyanate-based curing agent (XDI) at a mass ratio of 100:22.

Comparative Example 1

Resin composition containing an acryl-based resin i (glass transition temperature: 90° C., hydroxyl value: 81 mg KOH/g, weight average molecular weight: 35,000) and an isocyanate-based curing agent (XD1) at a mass ratio of 100:28.

Comparative Example 2

Resin composition containing an acryl-based resin i (glass transition temperature: 90° C., hydroxyl value: 81 mg KOH/g, weight average molecular weight: 35,000) and an isocyanate-based curing agent (XDI) at a mass ratio of 100:28.

Comparative Example 3

Resin composition containing an acryl-based resin j (glass transition temperature: 90° C., hydroxyl value: 120 mg KOH/g, weight average molecular weight: 35,000) and an isocyanate-based curing agent (XDI) at a mass ratio of 100:28.

Comparative Example 4

Resin composition containing an acryl-based resin k (glass transition temperature: 45° C., hydroxyl value: 150 mg KOH/g, weight average molecular weight: 15,000) and an isocyanate-based curing agent (XDI) at a mass ratio of 100:27.

The weight average molecular weight, the glass transition temperature Tg and the hydroxyl value of the resin A shown in Table 1 were measured by the following methods, respectively.

(1) Hydroxyl Value

The hydroxyl value was measured by the method specified in JIS K 1557-1.

(2) Weight Average Molecular Weight

A value measured by GPC analysis and calculated in terms of standard polystyrene was used.

(3) Glass Transition Temperature Tg

A temperature at which a peak shoulder was formed in a differential scanning calorimetry (DSC) method was defined as a glass transition temperature Tg (° C.).

[Production of Resin Molded Article]

Each decorative sheet obtained as described above was placed in a mold, heated at 350° C. for 7 seconds with an infrared heater, and preliminarily molded so as to follow the shape of the inside of the mold, so that the mold was closed (maximum draw ratio: 100%). Thereafter, the injected resin was injected into the cavity of the mold to integrally mold the decorative sheet and the injected resin, the molded product was taken out from the mold, and simultaneously the support (base material and release layer) was separated and removed to obtain a decorative resin molded article.

<Initial Adhesion of Decorative Layer and Protective Layer with Primer Layer Interposed Therebetween>

The decorative resin molded article obtained as described above was subjected to a checkerboard adhesion test (the article is notched so as to draw 11 lines in a longitudinal direction and 11 lines in a lateral direction at intervals of 2 mm, so that a checkerboard with 100 squares is formed, and Cellotape (registered trademark) manufactured by Nichiban Co., Ltd, is then press-bonded onto the checkerboard, and rapidly separated), and adhesion of the decorative layer and the protective layer with the primer layer interposed therebetween was evaluated in accordance with the following criteria.
(Evaluation Criteria)
○: Either the protective layer or the decorative layer was not peeled, and adhesion of these layers was satisfactory.

or in the state of a molded article, and transfer property was satisfactory.
○: Slight printing streaks etc. were observed in the state of a decorative sheet, but were not visually observed after molding, and therefore there was practically no problem.
Δ: There existed portions where ink transfer to the printing plate and printing streaks etc. were visually observed after molding.
x: Ink transfer to the printing plate and printing streaks etc. were observed over a wide range after molding, and the design feeling was considerably impaired.

TABLE 1

|  | Ionizing radiation curable resin composition for forming protective layer | Resin A | Tg (° C.) | Hydroxyl value (mgKOH/g) | Initial adhesion | Transfer property of decorative layer | L* value of decorative resin molded article |
|---|---|---|---|---|---|---|---|
| Example 1 | A | Acryl-based resin a | 40 | 0 | ○ | Δ | 2.04 |
| Example 2 |  | Acryl-based resin b | 50 | 0 | ○ | ○ | 2.09 |
| Example 3 |  | Acryl-based resin c | 80 | 0 | ○ | ⊙ | 1.98 |
| Example 4 |  | Acryl-based resin d | 105 | 0 | ○ | ⊙ | 1.01 |
| Example 5 |  | Acryl-based resin e | 105 | 0 | ○ | ⊙ | 1.67 |
| Example 6 |  | Acryl-based resin f | 135 | 25 | Δ | ⊙ | 1.86 |
| Example 7 |  | Acryl-based resin g | 70 | 35 | ○ | ⊙ | 1.62 |
| Example 8 |  | Acryl-based resin h | 90 | 40 | ○ | ⊙ | 1.92 |
| Example 9 |  | Ester-based resin a | 65 | 6 | ○ | ⊙ | 1.69 |
| Example 10 |  | Ester-based resin b | 67 | 6 | ○ | ○ | 1.59 |
| Example 11 |  | Urethane-based resin a | 92 | 19 | ○ | ⊙ | 1.56 |
| Example 12 |  | Mixed resin of acryl-based resin d:acryl-based resin i = 100:50 (mass ratio) | *1 | *2 | ○ | ⊙ | 1.05 |
| Example 13 |  | Mixed resin of acryl-based resin d:acryl-based resin i = 100:115 (mass ratio) | *1 | *2 | ○ | ⊙ | 1.35 |
| Example 14 |  | Mixed resin of acryl-based resin d:acryl-based resin i = 100:270 (mass ratio) | *1 | *2 | ○ | ⊙ | 1.90 |
| Comparative Example 1 |  | Acryl-based resin i | 90 | 81 | ○ | ⊙ | 3.24 |
| Comparative Example 2 | B | Acryl-based resin i | 90 | 81 | ○ | ⊙ | 2.96 |
| Comparative Example 3 |  | Acryl-based resin j | 90 | 120 | ○ | ⊙ | 3.02 |
| Comparative Example 4 | A | Acryl-based resin k | 45 | 150 | ○ | Δ | 2.69 |

*1: The acryl-based resin d has a glass transition temperature Tg of 105° C., and the acryl-based resin i has a glass transition temperature Tg of 90° C.
*2: The acryl-based resin d has a hydroxyl value of 0 mg KOH/g, and the acryl-based resin i has a hydroxyl value of 81 mg KOH/g.

Δ: The protective layer or the decorative layer was slightly peeled, but there was practically no problem.
x: The protective layer or the decorative layer was peeled.
<Measurement of L value of Decorative Resin Molded Article>
For a surface of the decorative resin molded article, the L* value in the L*a*b* color system was measured using Spectrophotometric Colorimeter CM-2500d (light source: D65, angle: 10°) manufactured by KONICA MINOLTA, INC. The results are shown in Table 1.
<Transfer Property of Decorative Layer to Primer Layer>
By gravure printing, a primer layer, a decorative layer and an adhesive layer were formed on a film with a release layer and a protective layer laminated in this order on a base material. At this time, occurrence of ink transfer to the printing plate, and the condition of printing streaks were visually examined in the state of a decorative sheet and in the state of a decorative resin molded article.
⊙: Ink transfer to the printing plate and printing streaks etc. were not observed either in the state of a decorative sheet

DESCRIPTION OF REFERENCE SIGNS

1: Base material
2: Release layer
3: Protective layer
4: Primer layer
5: Decorative layer
6: Adhesive layer
8: Molded resin layer
9: Transfer layer
10: Support

The invention claimed is:
1. A decorative resin molded article obtained by transferring a decorative sheet to a molded resin layer, wherein
the decorative sheet comprising a base material, and at least a protective layer, a primer layer and a decorative layer laminated in this order on the base material,
the decorative layer containing a black pigment,
the primer layer being formed of a cured product of a resin composition containing a resin A having a hydroxyl value of 44 mg KOH/g or less, wherein the resin A has a glass transition temperature 80° C. or more, and the decorative resin molded article has, on at least a part of a surface on the protective layer side, a black portion in which an L* value in the L*a*b* color system is 2.5 or less.

2. The decorative resin molded article according to claim 1, wherein the resin A has a glass transition temperature in a range of 80 to 140° C.

3. The decorative resin molded article according to claim 1, wherein the resin A has a hydroxyl value in a range of 0 to 25 mg KOH/g.

4. The decorative resin molded article according to claim 1, wherein a content of the resin A in the resin composition is 10% by mass or more based on an amount of resin components contained in the resin composition.

5. The decorative resin molded article according to claim 1, wherein the decorative layer is formed of the black pigment, and a resin composition containing a binder resin composed of the same resin as the resin A.

6. The decorative resin molded article according to claim 1, wherein at least a part of the decorative layer has a portion displaying a black design.

* * * * *